United States Patent [19]

Miedema et al.

[11] 4,082,138
[45] Apr. 4, 1978

[54] HEAT REGENERATOR

[75] Inventors: Andries Rinse Miedema; Kurt Heinz Jürgen Buschow; Jan Mulder, all of Eindhoven, Netherlands

[73] Assignee: U.S. Philips Corporation, New York, N.Y.

[21] Appl. No.: 607,793

[22] Filed: Aug. 26, 1975

[30] Foreign Application Priority Data

Sep. 2, 1974 Netherlands .................. 7411601

[51] Int. Cl.$^2$ ..................... C09K 5/00; F28D 17/00
[52] U.S. Cl. ............................. 165/4; 62/6; 252/70
[58] Field of Search .......... 252/67, 70, 71; 75/152, 75/134 R; 62/6; 165/4

[56] References Cited

U.S. PATENT DOCUMENTS 3,216,484  11/1965  Gifford .................................. 165/4
3,218,815  11/1965  Chellis et al. ........................... 62/6

OTHER PUBLICATIONS

Buschow et al., "Extremely large Heat Capacities between 4 and 10K", Cryogenics, May 15, 1975, pp. 261-264.

G. Schneider, "Crystal Structures of some Equiatomic Gadolinium Compounds", Acta Cryst. 18(6), 1082-1083 (1965); Ca. 63:5040e.

Dwight et al., "Equiatomic Compids of the Transition and Lanthanide Elements with Rh, Ir, Ni and Pt", Acta Cryst. 18(5), 835-839 (1965), Ca. 63:5043f.

Ghassem et al., "Intermediate Phases in Rare Earth-Rhodium Systems", Z. Metalk, 1973, 64(3), 197-199.

Ghassem et al., "Erbium-Rhodium System", Met. Trans. 1973, 4(3), 745-758.

Chamard-Bois et al., "Magnetic Structures of Rare Earth-Rhodium Equiatomic Compids, LhRh" Solid State Commun. 1972, 10(8), 685-689.

Chamard-Bois et al., "Determination of Crystal Field Levels in the Intermetallic Compid HoRh by Inelastic Neutron Scattering", Solid State Commun. 1973, 13(10), 1549-1553.

Chamard-Bois et al., "Magnetic Properties of Rh-Rare Earth Equiatomic Compids TRh", Phys. Status Solid B 1972, 49(1), 161-166, Ca. 76:65501c.

Primary Examiner—Harris A. Pitlick
Attorney, Agent, or Firm—Frank R. Trifari; Norman N. Spain

[57] ABSTRACT

A filling mass for low-temperature regenerators comprising one or more of the compounds of the formula $A_{1-x}B_xRh_{1-y}X_y$, wherein A = Sm, Gd, Tb, Dy or a mixture thereof, wherein B = Ho, Er, Tm, Yb or a mixture thereof, wherein X = Cu, Zn, Ru, Pd, Ag, Re, Os, Ir, Pt, Au or a mixture thereof, and wherein $0 \leq X \leq 1$ and $0 \leq y < 0.2$.

1 Claim, 1 Drawing Figure

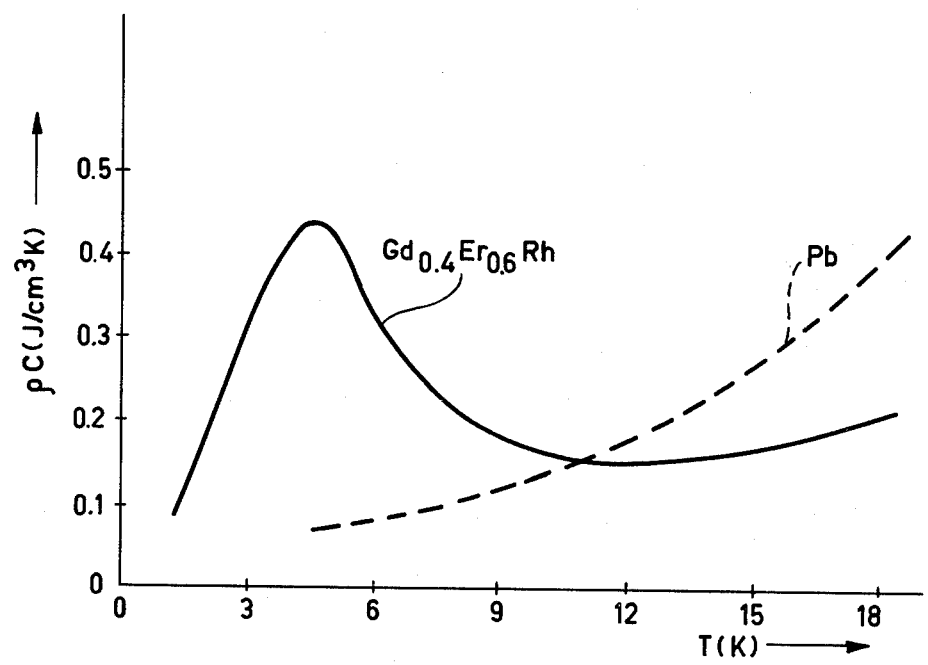

HEAT REGENERATOR

The invention relates to a low-temperature regenerator comprising a filling mass of heat-accumulating material.

Such regenerators, sometimes referred to as cold accumulators, are often used in refrigerators, for example, machines operating according to the Stirling cycle (U.S. Pat. Nos. 2,907,175 and 3,400,544), machines based on the Vuilleumier cycle (U.S. Pat. Nos. 2,657,552 and 3,523,427) and machines of the Gifford-McMahon type (U.S. Pat. Nos. 2,906,101 and 2,966,035). In such machines, compressed working medium flows through the regenerator in one direction and delivers its thermal energy to the filling mass, alternated by expanded working medium which flows in the opposite direction and takes up thermal energy from the filling mass. According as the regenerative effect is better, the thermal efficiency of the working medium cycle is higher and lower temperatures can be realised.

Regenerators are further used also in other low temperature systems, for example as heat exchangers in liquefaction systems (U.S. Pat. No. 3,214,926) or as a cold accumulator in a cold transport system for transporting cold from a cold source to a place to be cooled, in which cold stored in the regenerator can temporarily ensure a larger cooling capacity than can be supplied by the cold source alone (U.S. Pat. No. 3,630,043).

In low-temperature regenerators the filling mass usually consists of balls of, for example, lead or bronze or of layers of guaze of, for example, copper or phosphorus bronze (U.S. Pat. Nos. 3,216,484 and 3,218,815).

A problem occuring in such regenerators is that the heat accumulating material of which the filling mass consists, has an insufficient, too low specific heat at very low temperatures (below 20° K). For the above mentioned refrigerators this means that at the said low temperatures not sufficient thermal energy can be stored in the filling mass and be taken up therefrom again per cycle. With the use of the said known regenerators it is thus not possible to reach extremely low temperatures in refrigerators.

It is the object of the present invention to provide a regenerator which operates excellently at very low temperatures.

The regenerator according to the invention is characterized in that the filling mass consists of one or more of the compounds satisfying the formula $A_{1-x}B_xRh_{1-y}X_y$, wherein A is Sm, Gd, Tb, Dy or a mixture thereof, wherein B is Ho, Er, Tm, Yb or a mixture thereof, wherein X is Cu, Zn, Ru, Pd, Ag, Re, Os, Ir, Pt, Au or a mixture thereof, and wherein $0 \leq x \leq 1$ and $0 \leq y < 0.2$ Such intermetallic compounds of rare earths have the great advantage of having extremely favourable values of the specific heat at very low temperatures.

As a result of this the regenerator according to the invention has a heat accumulating capacity at the said very low temperatures which is much larger than that of the regenerators known so far. Consequently it is now possible to achieve extremely low temperatures in a simple manner in refrigerators having a regenerator.

The invention will be described in greater detail with reference to the FIGURE and a table.

The FIGURE shows the course of the volumetric specific heat of $Gd_{0.4}Er_{0.6}Rh$ and Pb, respectively, as a function of the absolute temperature within the temperature range of 0°–18° K. Below 9° K, $Gd_{0.4}Er_{0.6}Rh$ has a significantly larger specific heat with a maximum at 4.7° K.

$Gd_{0.4}Er_{0.6}Rh$ belongs to the sub-group of compounds of the formula $Gd_{1-x}Er_xRh$, wherein x in this case has the value 0.6. It has now been found that when x varies, not only the site of the specific heat maximum (top) on the temperature scale varies, but also the value of said specific heat maximum (top height). This is illustrated by the following Table

| $Gd_{1-x}Er_xRh$ | $T_m(K)$ | $\rho C_m(J/cm^3 K)$ |
|---|---|---|
| x = 0 | 19.5 | 0.9 |
| 0.1 | 16.1 | 0.7 |
| 0.2 | 12.6 | 0.5 |
| 0.4 | 7.3 | 0.3 |
| 0.5 | 5.0 | 0.4 |
| 1.0 | 3.1 | 1.0 |

In this table, $T_m$ is the absolute temperature at which the specific heat is maximum and $\rho C_m$ is the value of said specific heat maximum rounded off to one decimal.

By suitably mixing compounds of the series $Gd_{1-x}Er_xRh$ it is thus possible to adapt the specific heat curve to the practical needs in an optimum manner.

Such a consideration applies more generally to all compounds of the series $A_{1-x}B_xRh_{1-y}X_y$, wherein A, in addition to Gd, may be Sm, Tb or Dy or a mixture of the said elements, B in addition to Er may be Ho, Tm or Yb or a mixture of the said elements, wherein X may be Cu, Zn, Ru, Pd, Ag, Re, Os, Ir, Pt, Au or a mixture of the said elements and wherein $0 \leq x \leq 1$ and $0 \leq y < 0.2$.

What is claimed is:

1. In a low-temperature regenerator comprising a filling mass of a heat accumulating material in a housing the improvement wherein the heat accumulating material has a relatively high specific heat at temperatures below 20° K and is formed of at least one compound of the formula $A_{1-x}B_xRh_{1-y}X_y$, wherein A is at least one element selected from the group consisting of Sm, Gd, Tb and Dy, B is at least one element selected from the group consisting of Ho, Er, Tm and Yb, X is at least one element selected from the group consisting of Cu, Zn, Ru, Pd, Ag, Re, Os, Ir, Pt and Au, $0 \leq x \leq 1$ and $0 \leq y < 0.2$.

* * * * *